US008112438B2

(12) United States Patent
Hattori (10) Patent No.: US 8,112,438 B2
(45) Date of Patent: Feb. 7, 2012

(54) COORDINATOR SERVER, DATABASE SERVER, AND PIPELINE PROCESSING CONTROL METHOD

(75) Inventor: Masakazu Hattori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 688 days.

(21) Appl. No.: 12/234,727

(22) Filed: Sep. 22, 2008

(65) Prior Publication Data

US 2009/0113188 A1   Apr. 30, 2009

(30) Foreign Application Priority Data

Oct. 29, 2007   (JP) .................................. 2007-280649

(51) Int. Cl.
*G06F 17/30* (2006.01)

(52) U.S. Cl. .......................... 707/770; 707/764; 708/233

(58) Field of Classification Search ............. 707/999.01, 707/999.107, 769, 770, 764; 708/233
See application file for complete search history.

(56) References Cited

U.S. PATENT DOCUMENTS

| 6,256,621 | B1 * | 7/2001 | Tsuchida et al. ..................... 1/1 |
| 7,565,370 | B2 * | 7/2009 | Milenova et al. ..................... 1/1 |
| 2001/0014888 | A1 | 8/2001 | Tsuchida et al. |
| 2002/0143755 | A1 * | 10/2002 | Wynblatt et al. ................... 707/3 |
| 2003/0014393 | A1 | 1/2003 | Kabra et al. |
| 2003/0037048 | A1 | 2/2003 | Kabra et al. |
| 2005/0256892 | A1 * | 11/2005 | Harken .......................... 707/101 |
| 2008/0104041 | A1 * | 5/2008 | Bjornson et al. ................... 707/3 |
| 2008/0189350 | A1 * | 8/2008 | Vasa et al. ...................... 709/201 |
| 2010/0153508 | A1 * | 6/2010 | Tonegawa ...................... 709/206 |

FOREIGN PATENT DOCUMENTS

| JP | 06-348554 | 12/1994 |
| JP | 08-006829 | 1/1996 |
| JP | 2001-147847 | 5/2001 |
| JP | 2005-018776 | 1/2005 |
| JP | 2005-208757 | 8/2005 |

OTHER PUBLICATIONS

European Search Report dated Jan. 21, 2009 corresponding to U.S. Appl. No. 12/234,727, filed Sep. 22, 2008.

* cited by examiner

*Primary Examiner* — Leslie Wong
(74) *Attorney, Agent, or Firm* — Turocy & Watson, LLP (57) ABSTRACT

A first transmitting unit transmits a processing command to a plurality of parallelized database servers. A second transmitting unit integrates data sets transmitted from the database servers in response to the processing command, and transmits an integrated data set to a client. An integrating unit integrates data sets buffered in a buffer unit. A determining unit determines a transmission start or a transmission suspend of the data sets based on a data size in the buffer unit. A third transmitting unit transmits a control command for the transmission start or the transmission suspend to the database servers based on a result of determination by the first determining unit.

7 Claims, 9 Drawing Sheets

```
SELECT    TITLE
FROM      BIBLIOGRAPHIC DB
WHERE     PUBLISHED YEAR >1996
ORDER BY  PUBLISHER NAME
```

FIG.4

```
SELECT    TITLE, PUBLISHER
FROM      BIBLIOGRAPHIC DB
WHERE     PUBLISHED YEAR > 1996
ORDER BY  PUBLISHER NAME
```

COORDINATOR SERVER, DATABASE SERVER, AND PIPELINE PROCESSING CONTROL METHOD

CROSS-REFERENCE TO RELATED APPLICATIONS

This application is based upon and claims the benefit of priority from the prior Japanese Patent Application No. 2007-280649, filed on Oct. 29, 2007; the entire contents of which are incorporated herein by reference.

BACKGROUND OF THE INVENTION

1. Field of the Invention

The present invention relates to a coordinator server and a plurality of database servers constituting a parallel database, and a pipeline processing control method performed by the parallel database.

2. Description of the Related Art

Conventionally, as a high speed technology of a processor that performs reading, interpretation, and execution of commands, and writing of results thereof, for example, there is a pipeline processing technology. Pipeline processing independently operates a process of each phase, in which before a processing cycle of a previous phase finishes, a process of the next phase is started, and this process is repeated. Accordingly, an assembly-line operation is realized and the performance of the entire processing is improved.

Meanwhile, there is a parallel database technology as a technique for managing a large amount of data. In the parallel database technology, a system including a plurality of servers is established to correspond to a large amount of data. A large amount of data set having a uniform data format is arranged in a plurality of databases. There is also a case that the data set is arranged not in a distributed manner, but in an overlapped manner on a plurality of databases. By arranging the data set in this manner, an improvement of throughput can be expected in a case that the number of simultaneous accesses to the same data is high.

A system of managing the data in such a parallel database is largely divided into three methods, that is, a system in which a plurality of servers do not share a disk (disk nonshared system), a system in which the servers share a disk (disk sharing system), and a system in which the servers share a disk and a memory (memory sharing system).

The disk nonshared system is mainly explained here. When the data set is divided into a plurality of databases and arranged, two methods of vertical division of data set and horizontal division of data set can be considered (fragmentation). The horizontal division of the data set is to create a subset of data set. A data partitioning technique described later becomes important. The vertical division of the data is to divide the data in a unit of attribute or column. Each division method includes a merit and demerit according to an individual access pattern. For example, in the vertical division of data, high speed can be acquired if data scanning of a size with few inquiries is good enough. However, if original data is required, data coupling is required between servers, and the performance is greatly deteriorated.

Each server used in the parallel database in the disk nonshared system can perform parallel access by individually accessing a plurality of databases in which the data set is arranged in the divided manner, and improvement of performance corresponding to the number of databases can be expected. Accordingly, processing efficiency and response time can be improved (partition parallelization).

As the data partitioning method, key range partitioning and hash partitioning are known. For example, it is assumed here that a large amount of data set is expressed with relation. In the key range partitioning and the hash partitioning, there are a case of using one column value of a table and a case of using a plurality of column values of the relation. When such data partitioning is performed, although loads are concentrated, in search with a range condition with respect to a target column, inefficiency caused by accessing an irrelevant database can be avoided. Further, in the search including natural coupling in the target column, coupling between different databases is not required, thereby enabling to considerably improve the performance.

In the parallel database, loads are concentrated on a specific database at the time of search, unless balanced data partitioning is performed, thereby making it difficult to exhibit a parallelization effect. However, respective data sizes may be unbalanced due to a change in the trend of input data, which cannot be avoided by using a predetermined data division rule. Therefore, improvement techniques such as dynamically changing the key range and changing the hash value have been proposed. With these techniques, however, the load due to data shift related to the change increases.

The parallel database often includes one coordinator server and a plurality of database (DB) servers. In such a configuration, following processing is performed in the parallel database. That is, the coordinator server having received a request from a client analyzes the request to generate a plan, and divides and distributes the plan to each of the DB servers. Each DB server executes the distributed plan and transmits data set of a processing result to the coordinator server. The coordinator server performs aggregation processing such as merge with respect to the transmitted data set, and transmits the aggregation result to the client. The data transferred between the servers is stream transmitted on a network such as a local area network (LAN). Therefore, in the parallel database, also the network is often realized on distributed parallel platforms such as interconnect between high-speed servers.

To realize high speed in the above processing, in the parallel database, a mechanism for performing phase processing such as scanning, sorting, and joining of internal processing of structured query language (SQL) in parallel by a plurality of processes and a plurality of servers is incorporated. In a part of database products, a pipeline system in which the process in each phase is operated independently, and before a previous phase process finishes, the next phase process is started has been adopted (pipeline parallelization).

With regard to the pipeline parallelization, for example, JP-A 2001-147847 (KOKAI) discloses a method in which the number of respective nodes is determined corresponding to database operation to be executed by each node constituting the parallel database system, and when there is a difference in division of data, the data is equally distributed to each node. According to the technique disclosed in JP-A 2001-147847 (KOKAI), because respective database operation to be executed by each node is parameterized, to equalize the expected processing time, there is no deviation in the processing time between respective nodes, and smooth operation can be realized in the pipeline processing.

However, the technique described in JP-A 2001-147847 (KOKAI) is for equalizing central processing unit (CPU) processing other than disk input/output (I/O) processing such as sort and merge in the parallel database by distributing the CPU processing to a plurality of nodes. Therefore, there can be a problem described below in the pipeline processing such as fetch associated with a data acquisition request from the client. That is, when the processing performed by a coordinator server cannot catch up with the processing of the DB server, the data set can be accumulated on the coordinator server side, thereby putting pressure on resources such as a memory of the coordinator server.

SUMMARY OF THE INVENTION

According to one aspect of the present invention, there is provided a coordinator server that is configured to be connected to a plurality of parallelized database servers each storing data and that is capable of performing a pipeline processing. The coordinator server includes a first transmitting unit that transmits a processing command to the database servers in response to a query request for requesting a data acquisition from a client; a buffer unit that buffers data sets transmitted from the database servers as a result of a processing according to the processing command;
an integrating unit that integrates the data sets buffered in the buffer unit to obtain a merged data set;
a second transmitting unit that transmits the merged data set to the client; and a third transmitting unit that transmits a control command instructing the transmission start or the transmission suspend of the data sets to the database servers based on a result of determination by the first determining unit.

Furthermore, according to another aspect of the present invention, there is provided a database server that is one of a plurality of parallelized database servers and that performs a processing in response to a processing command transmitted from a coordinator server and transmits a data set that is a result of the processing to the coordinator server. The database server includes a setting unit that sets a transmission amount for a single time of transmission of the data set to be transmitted as the result of the processing to the coordinator server such that the transmission amount is increased every time a transmission is performed; and a transmitting unit that transmits the data set of a set transmission amount to the coordinator server.

Moreover, according to still another aspect of the present invention, there is provided a pipeline processing control method to be executed in a coordinator server that is connected to a plurality of parallelized database servers each storing data and that is capable of performing a pipeline processing. The pipeline processing control method includes transmitting a processing command to the database servers in response to a query request for requesting a data acquisition from a client; transmitting including integrating data sets transmitted from the database servers as a result of a processing according to the processing command, and transmitting a data set obtained by integrating the data sets to the client; integrating the data sets transmitted from the database servers and buffered in a buffer unit; determining a transmission start or a transmission suspend of the data sets from the database servers based on a data size of the data sets buffered in the buffer unit; and transmitting a control command instructing the transmission start or the transmission suspend of the data sets to the database servers based on a result of determination at the determining.

Furthermore, according to still another aspect of the present invention, there is provided a pipeline processing control method to be executed in a coordinator server that is connected to a plurality of parallelized database servers each storing data and that is capable of performing a pipeline processing. The pipeline processing control method includes setting a transmission amount for a single time of transmission of the data set to be transmitted as the result of the processing to the coordinator server such that the transmission amount is increased every time a transmission is performed; and transmitting the data set of a set transmission amount to the coordinator server.

DETAILED DESCRIPTION OF THE INVENTION

Exemplary embodiments of the present invention will be explained below in detail with reference to the accompanying drawings.

Figure 1:
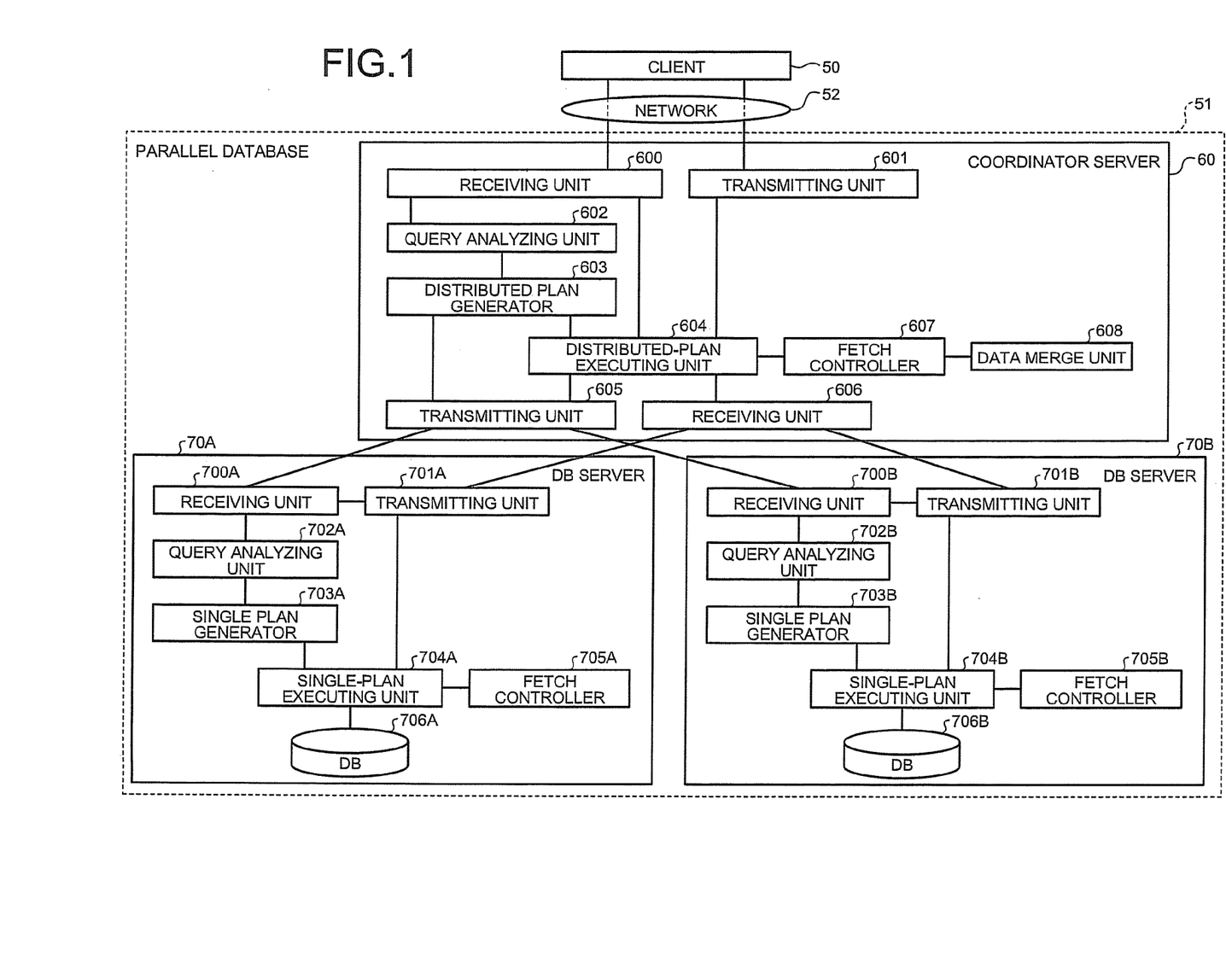
FIG. 1 is an example of a configuration of a parallel database system according to an embodiment of the present invention.

FIG. 1 is an example of a configuration of a parallel database system according to an embodiment of the present invention. The parallel database system includes a client computer (hereinafter, "client") 50 that executes an application program, and a parallel database 51, where the client 50 and the parallel database 51 are connected via a network 52. The parallel database 51 has a coordinator server 60 and a plurality of DB servers 70A to 70B. The network 52 is, for example, a LAN, the Intranet, the Ethernet (registered trademark), or the Internet. The coordinator server 60 is connected to the client 50 and DB servers 70A and 70B. Upon reception of a query request from the client 50, the coordinator server 60 transmits a processing request such as a command or an execution plan to the DB servers 70A and 70B, receives the processing result from the DB servers 70A and 70B, and transmits the processing result corresponding to the query request to the client 50. The DB servers 70A and 70B respectively have a database such as a parallelized relational database, and respectively control storage in or an access to the database. The DB servers 70A and 70B respectively receive a processing request such as a command or an execution plan transmitted from the coordinator server 60 to transmit the processing result corresponding to the request to the coordinator server 60.

The client 50, the coordinator server 60, and the DB servers 70A to 70B respectively includes a controller such as a central processing unit (CPU) that controls the entire apparatus, memories such as a read only memory (ROM) for storing various data and various programs and a random access memory (RAM), an external memory such as a hard disk drive (HDD) or a compact disk (CD) drive for storing various data and various programs, a display device such as a display that displays information, an input unit such as a keyboard and a mouse for a user to input various processing requests, a communication controller that communicates with an external computer via the network 52, and a bus for connecting these, and have a hardware configuration using a normal computer.

In such a hardware configuration, various functions to be realized by the coordinator server 60 by executing various programs stored in the memory and the external memory are explained. Each unit, which is an entity of various functions realized by the coordinator server 60, is explained. The coordinator server 60 includes a receiving unit 600, a transmitting unit 601, a query analyzing unit 602, a distributed plan generator 603, a distributed-plan executing unit 604, a transmitting unit 605, a receiving unit 606, a fetch controller 607, and a data merge unit 608.

The receiving unit 600 receives data such as the query request from the client 50. The transmitting unit 601 transmits data such as the processing result to the client 50. The query analyzing unit 602 analyzes the query request from the client 50. The distributed plan generator 603 generates distributed plans to be performed by each of the DB servers 70A and 70B based on the analyzed query request. The distributed-plan executing unit 604 executes the generated distributed plan. The receiving unit 606 receives data such as the processing result transmitted from the DB servers 70A and 70B. The transmitting unit 605 transmits data such as the distributed plan to the DB servers 70A and 70B.

The data merge unit 608 merges two data sets acquired as the processing result from the respective DB servers 70A and 70B to integrate the data set. When the processing request such as a fetch request of a cursor is received as the processing request relating to the transmission of the processing result via the receiving unit 600 from the client 50, the data merge unit 608 performs processing corresponding to the request. The fetch controller 607 determines whether to start or suspend transmission of the data set from the DB servers 70A and 70B based on the data size of the data set, at the time of acquiring (GET) the data set of the processing result from the respective DB servers 70A and 70B, and appropriately transmits a control command indicating a determination content to the DB servers 70A and 70B, to thereby control transmission of the data set from the DB servers 70A and 70B. The fetch controller 607 transmits the data set merged by the data merge unit 608 as the processing result to the client 50 via the transmitting unit 601.

Functions realized by executing various programs stored in a storage unit or an external storage unit by the DB server 70A are explained. Each unit, which becomes the entity of the various functions realized by the DB server 70A, is explained. The DB server 70A includes a receiving unit 700A, a transmitting unit 701A, a query analyzing unit 702A, a single plan generator 703A, a single-plan executing unit 704A, and a fetch controller 705A. The DB server 70A further includes, for example, a DB 706A stored in the external storage unit. The receiving unit 700A receives data such as a processing request from the coordinator server 60. The transmitting unit 701A transmits data such as a processing result to the coordinator server 60. The query analyzing unit 702A analyzes the processing request such as a command or a plan transmitted from the coordinator server 60. The single plan generator 703A generates a single plan for accessing the DB 706A from the analyzed query. In the single plan, for example, a DB access operator such as index scanning, data acquisition, and data comparison is included. The single-plan executing unit 704A executes the generated single plan. The fetch controller 705A transmits the data set acquired as a result of executing the single plan as the processing result to the coordinator server 60 via the transmitting unit 701A. The fetch controller 705A controls transmission of the data set corresponding to a control command described later transmitted from the coordinator server 60.

The DB server 70B includes a receiving unit 700B, a transmitting unit 701B, a query analyzing unit 702B, a single plan generator 703B, a single-plan executing unit 704B, and a fetch controller 705B. Because configurations of these respective units are substantially the same as those of the receiving unit 700A, the transmitting unit 701A, the query analyzing unit 702A, the single plan generator 703A, the single-plan executing unit 704A, and the fetch controller 705A, explanations thereof are omitted. The DB server 70B has, for example, a DB 706B stored in the external storage unit. The DB 706B and the DB 706A included in the DB server 70A are relational database including a plurality of records having the same relational schema, and are in a state with the database being divided into two by horizontal division.

Figure 2:
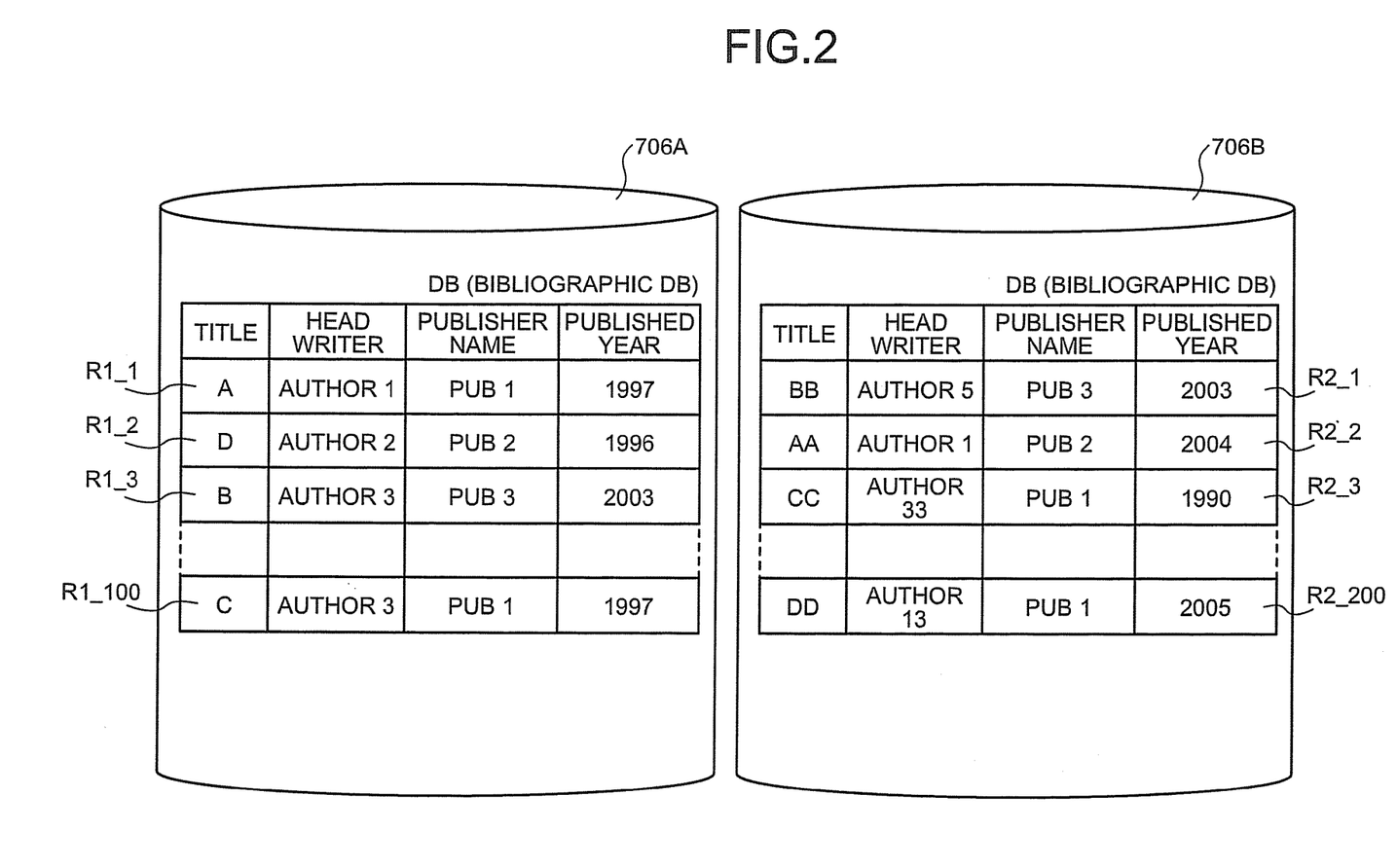
FIG. 2 is an example of data respectively stored in databases.

FIG. 2 is an example of data respectively stored in the DB 706A and the DB 706B. It is assumed here that the DB 706A and the DB 706B store bibliographic data relating to bibliography, and function as a bibliographic DB. For example, the DB 706A stores 100 items of bibliographic data R1_1 to R1_100, and the DB 706B stores 200 items of bibliographic data R2_1 to R2_100. Respective bibliographic data have four columns for title, head writer, publisher name, and published year. A character string index is added to the publisher name column, and record ID is added to each record in the bibliographic data.

Figure 3:
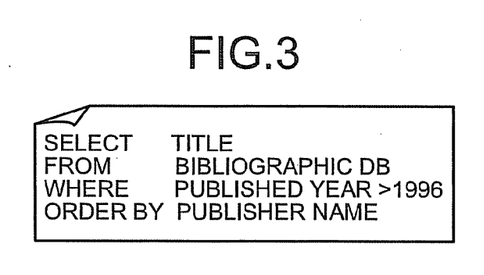
FIG. 3 is an example of a query request transmitted from a client to a coordinator server.

FIG. 3 is an example of a query request transmitted from the client 50 to the coordinator server 60. The query request is for requesting acquisition of data, and for example, SQL language is used for the query request. The query request of "select: title, from: bibliographic DB, where: published year >1996, order by: publisher name" requests to return data including title and publisher name, among data of publication with the published year being after 1996, in ascending order by the publisher name.

Figure 4:
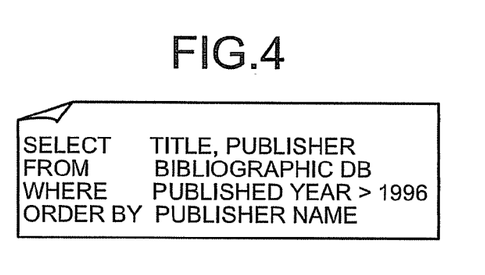
FIG. 4 is an example of a distributed plan generated by the coordinator server with respect to the query request shown in FIG. 3.

FIG. 4 is an example of a distributed plan generated by the coordinator server 60 with respect to the query request shown in FIG. 3. The distributed plan is generated by the distributed plan generator 603 after the query analyzing unit 602 in the coordinator server 60 analyzes the query transmitted from the client 50. The plan is actually generated as data such as binary data; however, it is shown here in a simplified manner. The distributed plan shown in FIG. 4 has meanings (a) and (b) shown below.

(a) Respective DB servers 70A and 70B return data set including "publication with the published year being in or after 1996, and with the title being arranged in ascending order by publisher name" to the coordinator server 60.

(b) The coordinator server 60 merges two data sets acquired from the DB servers 70A and 70B in ascending order by publisher name column.

A result acquired by executing the distributed plan becomes the data set corresponding to the query request shown in FIG. 3.

Figure 5:
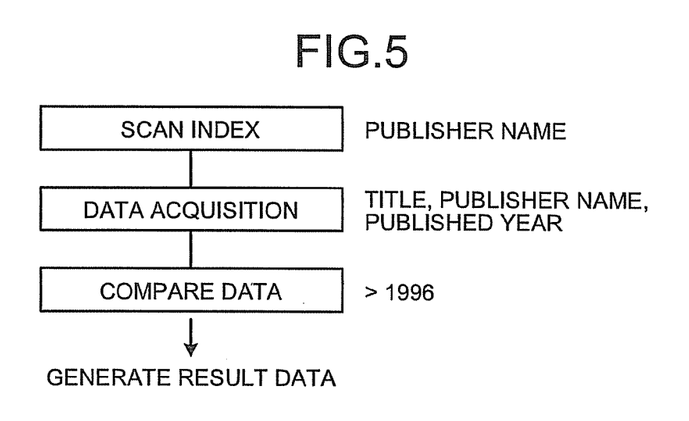
FIG. 5 schematically depicts an example of a single plan generated by a DB server.

FIG. 5 schematically depicts an example of a single plan generated by the DB server 70A. The single plan is generated by the single plan generator 703A after the query analyzing unit 702A in the DB server 70A analyzes the distributed plan transmitted from the coordinator server 60. The single plan shown in FIG. 5 has meanings (c), (d), and (e) shown below.

(c) Index scanning: Index scanning is performed according to character string index added to the publisher name in the bibliographic data, to acquire sets of record ID added to each record in ascending order.

(d) Data acquisition: Column values of three columns, that is, title, publisher name, and published year are acquired, among the columns included in each record of the bibliographic data, based on each record ID acquired as a result of the index scanning.

(e) Data comparison: Only the record with the acquired column value in published year exceeding "1996" is filtered.

The single plan executing unit 704A in the DB server 70A executes such a single plan, to generate a result list indicating data sets acquired as a result of filtering in (e). The fetch controller 705A acquires a data set based on the result list, and transmits the data set as a processing result to the coordinator server 60 via the transmitting unit 701A. The DB server 70B performs the same processing as that of the DB server 70A.

Figure 6:
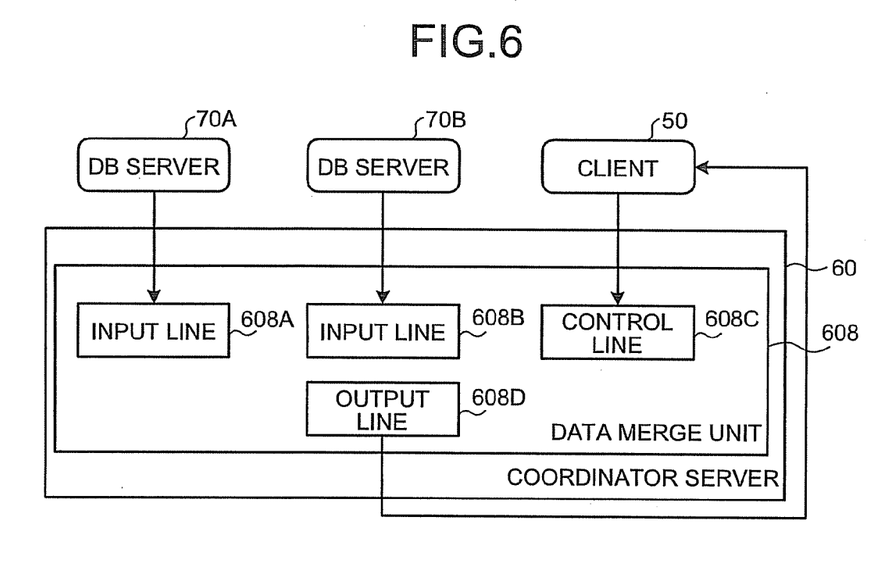
FIG. 6 depicts a concept of a merge process performed by a data merge unit.

An outline of a process in which the data sets transmitted from the DB servers 70A and 70B as the processing result are merged by the data merge unit 608 in the coordinator server 60 is explained next. FIG. 6 depicts a concept of the merge process performed by the data merge unit 608. The data set acquired from the DB server 70A is buffered in an input line 608A, and the data set acquired from the DB server 70B is buffered in an input line 608B. The data merge unit 608 merges the data sets buffered in the input lines 608A and 608B in ascending order by publisher name, and buffers the merged data set in an output line 608D. A request such as a cursor fetch request, transmitted from the client 50, is input to a control line 608C. The data merge unit 608 determines whether to transmit the data set buffered in the output line 608D to the client 50, based on the request such as the cursor fetch request input to the control line 608C.

Figure 7:
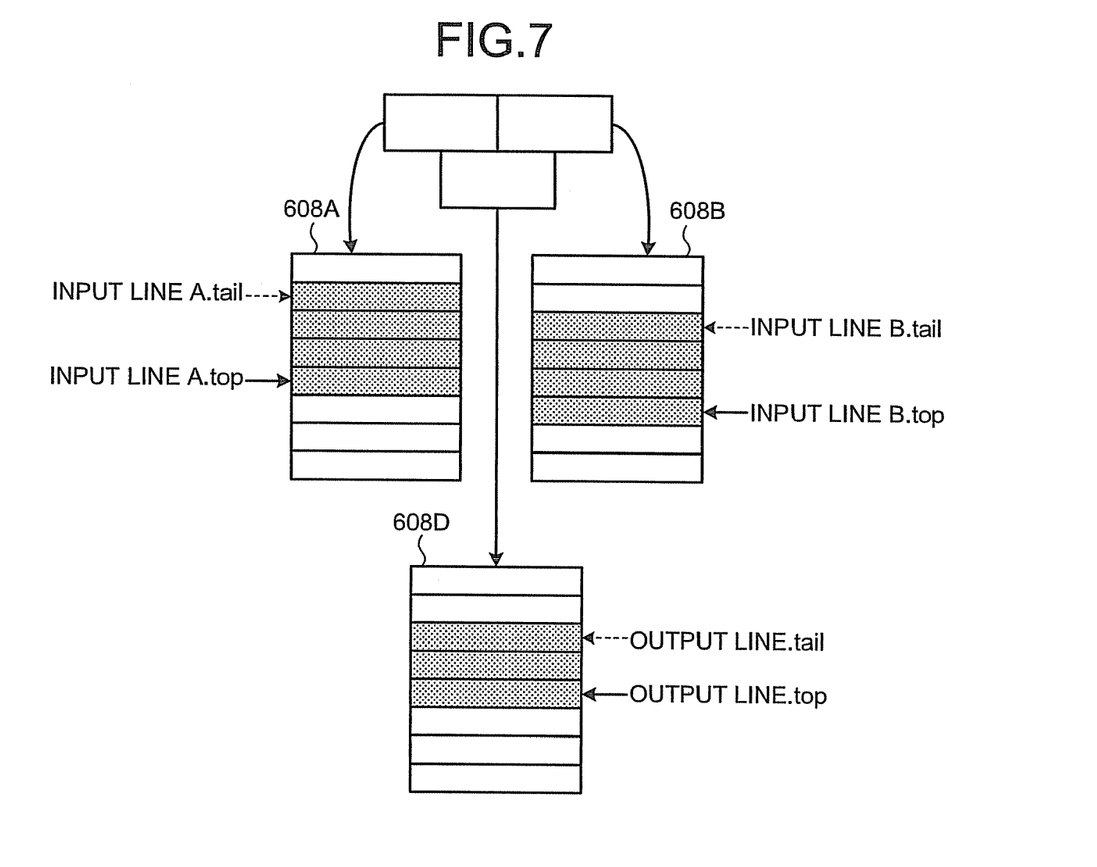
FIG. 7 is a schematic diagram of a data structure of input lines and an output line.

The input lines 608A and 608B, the output line 608D, and the control line 608C have a predetermined configuration structure, respectively. For example, the configuration structure is a queue structure such as a ring buffer, added with a tail cursor and a top cursor, respectively. FIG. 7 is a schematic diagram of a data structure of the input lines 608A and 608B and the output line 608D. For example, an input line A.tail for specifying the last data of the data set and an input line A.top for specifying the first data of the data set are added to the input line 608A. Likewise, an input line B.tail and an input line B.top are added to the input line 608B. An output line.tail for specifying the last data and an output line.top for specifying the first data of the data set, which has not been transmitted to the client 50, are added to the output line 608D.

The fetch controller 607 in the coordinator server 60 determines to start or suspend transmission of the data sets from the DB servers 70A and 70B, based on the data size of the data sets buffered in the output line 608D and the input lines 608A and 608B. Details of this processing will be explained in an operation section below.

On the other hand, in the present embodiment, the fetch controller 705A in the DB server 70A and the fetch controller 705B in the DB server 70B increase stepwise the transmission block size of the data sets to be transmitted to the coordinator server 60, and suspend or resume transmission of the data sets according to the control command transmitted from the coordinator server 60. Details of the processing performed by the fetch controllers 705A to 705B will be also explained in the operation section below.

The operation of the parallel database system according to the present embodiment is explained next. First, a process procedure performed by the coordinator server 60 is explained with reference to FIG. 8. The query analyzing unit 602 in the coordinator server 60 analyzes the query transmitted from the client 50, and the distributed plan generator 603 generates each distributed plan and transmits the plan to each of the DB servers 70A and 70B via the transmitting unit 605. As a result, each data set transmitted from the DB servers 70A and 70B is respectively buffered in the input lines 608A and 608B, which is then merged and buffered in the output line 608D. At this time, the coordinator server 60 determines whether the data size of the data set buffered in the output line 608D satisfies condition 1 (Step S1). The condition 1 is such that the data size is equal to or lower than a first low watermark (LWM). When the determination result is positive, the coordinator server 60 determines that the data set in the output line is insufficient or scant.

Figure 8:
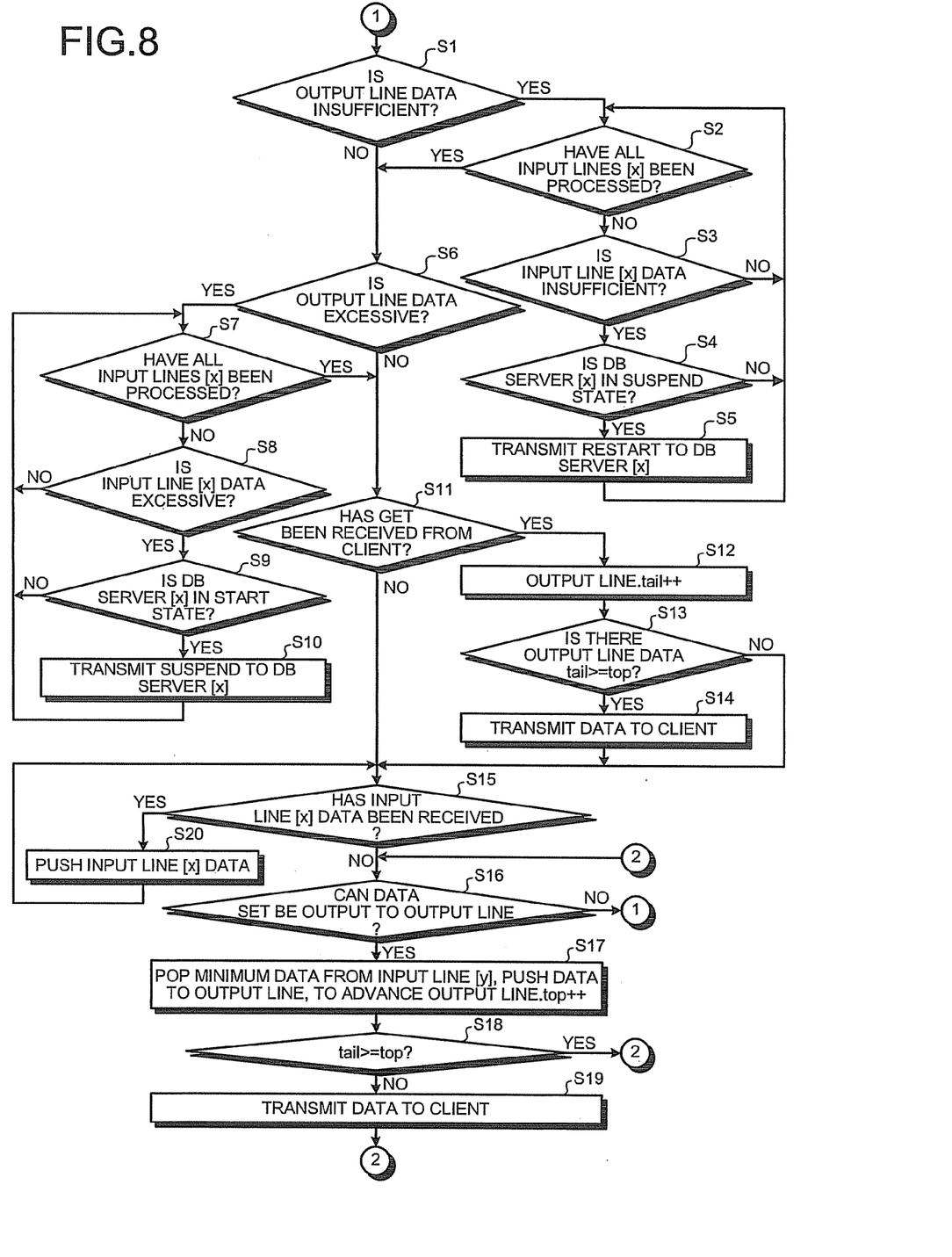
FIG. 8 is a flowchart of a process procedure performed by the coordinator server.

The coordinator server 60 then determines whether processing has been performed with respect to all input lines 608A and 608B (Step S2). When the determination result is negative, the coordinator server 60 determines whether the data size of each data set buffered in each of the input lines 608A and 608B satisfies condition 3 (Step S3). The condition 3 is such that the data size is equal to or lower than a second low watermark (LWM[x]). When the data size of the data set in at least one of the input lines 608A and 608B satisfies the condition 3, the coordinator server 60 determines that the data sets in the input line satisfying the condition 3 (referred to as an insufficient input line) is insufficient or scant. The coordinator server 60 then determines whether the DB server (at least one of the DB servers 70A and 70B), which buffers the data set in the insufficient input line, is in a suspended (SUSPEND) state (Step S4). When the determination result is positive, the coordinator server 60 transmits a control command instructing transmission of the data set (RESTART command) to the DB server, which buffers the data set in the insufficient input line, to increase the data set in the insufficient input line (Step S5).

When the determination result at Step S1 is negative, the coordinator server 60 determines whether the data size of the data set buffered in the output line satisfies condition 2 (Step S6). The condition 2 is such that the data size is equal to or higher than a first high watermark (HWM). When the determination result is positive, the coordinator server 60 determines that the data set in the output line 608D is excessive. The coordinator server 60 then determines whether all the input lines 608A and 608B have been processed (Step S7), and when the determination result is negative, determines whether the data size of the data set buffered in the input lines 608A and 608B satisfies condition 4 (Step S8). The condition 4 is such that the data size is equal to or higher than a second high watermark (HWM[x]). When the data size of the data set in at least one of the input lines 608A and 608B satisfies the condition 4, the coordinator server 60 determines that the data sets in the input line satisfying the condition 4 (referred to as an excessive input line) are excessive. The coordinator server 60 then determines whether the DB server (at least one of the DB servers 70A and 70B), which buffers the data set in the excessive input line, is in a start (START) state (Step S9). When the determination result is positive, the coordinator server 60 transmits a control command instructing to suspend transmission of the data set (SUSPEND command) to the DB server, which buffers the data set in the excessive input line, to decrease the data sets in the excessive input line (Step S10).

When the determination result at Step S6 is negative, or the determination result at Step S7 is positive, control proceeds to Step S11. At Step S11, the coordinator server 60 determines whether there is a data acquisition (GET) request from the client 50, and when the determination result is positive, advances the output line.tail (Step S12). The coordinator server 60 then determines whether the output line.tail is higher than the output line.top (Step S13). When the determination result is positive, transmission is possible and an untransmitted data set has already been buffered in the output line. Therefore, the coordinator server 60 transmits the data set to the client 50 as the processing result (Step S14), to proceed to Step S15. Also when the determination result at Step S11 is negative, control proceeds to Step S15.

At Step S15, the coordinator server 60 determines whether the data set has been received from at least one of the DB servers 70A and 70B. When the determination result is positive, the coordinator server 60 buffers the data set in the corresponding input line (at least one of the input lines 608A and 608B), and advances the corresponding input line.tail (at least one of the input line A.tail and the input line B.tail).

When the determination result at Step S15 is negative, the coordinator server 60 determines whether the data set buffered in at least one of the DB servers 70A and 70B can be output to the output line 608D (Step S16). When the determination result is positive, the coordinator server 60 pops the data from the input line in which the minimum data is buffered (hereinafter, "input line [y]"), returns the input line [y].top, and pushes the data to the output line 608D, to advance the output line.top (Step S17).

The coordinator server 60 then determines whether the output line.tail is higher than the output line.top (Step S18). When the determination result is positive, transmission is possible and an untransmitted data set has already been buffered in the output line 608D. Therefore, the coordinator server 60 transmits the data set to the client 50 as the processing result (Step S19).

Respective values of the first high watermark (HWM), the second high watermark (HWM[x]), the first low watermark (LWM), and the second low watermark (LWM[x]) are preset and stored in the storage unit or the external storage unit. Further, the respective values can be set to appropriate values by taking statistics of the input data size and the output data size by each phase processing. Alternatively, it can be determined by pre-analysis according to a query request (SQL). For example, configuration examples of respective values of the first high watermark (HWM) and the first low watermark (LWM) are as follows.

$HWM=2W$ $LWM=W$ where W is a value obtained by dividing the input data size and the output data size by a block size.

It is assumed that the phase processing is performed by designating one block (for example, 4 KB) as one unit.

Figure 9:
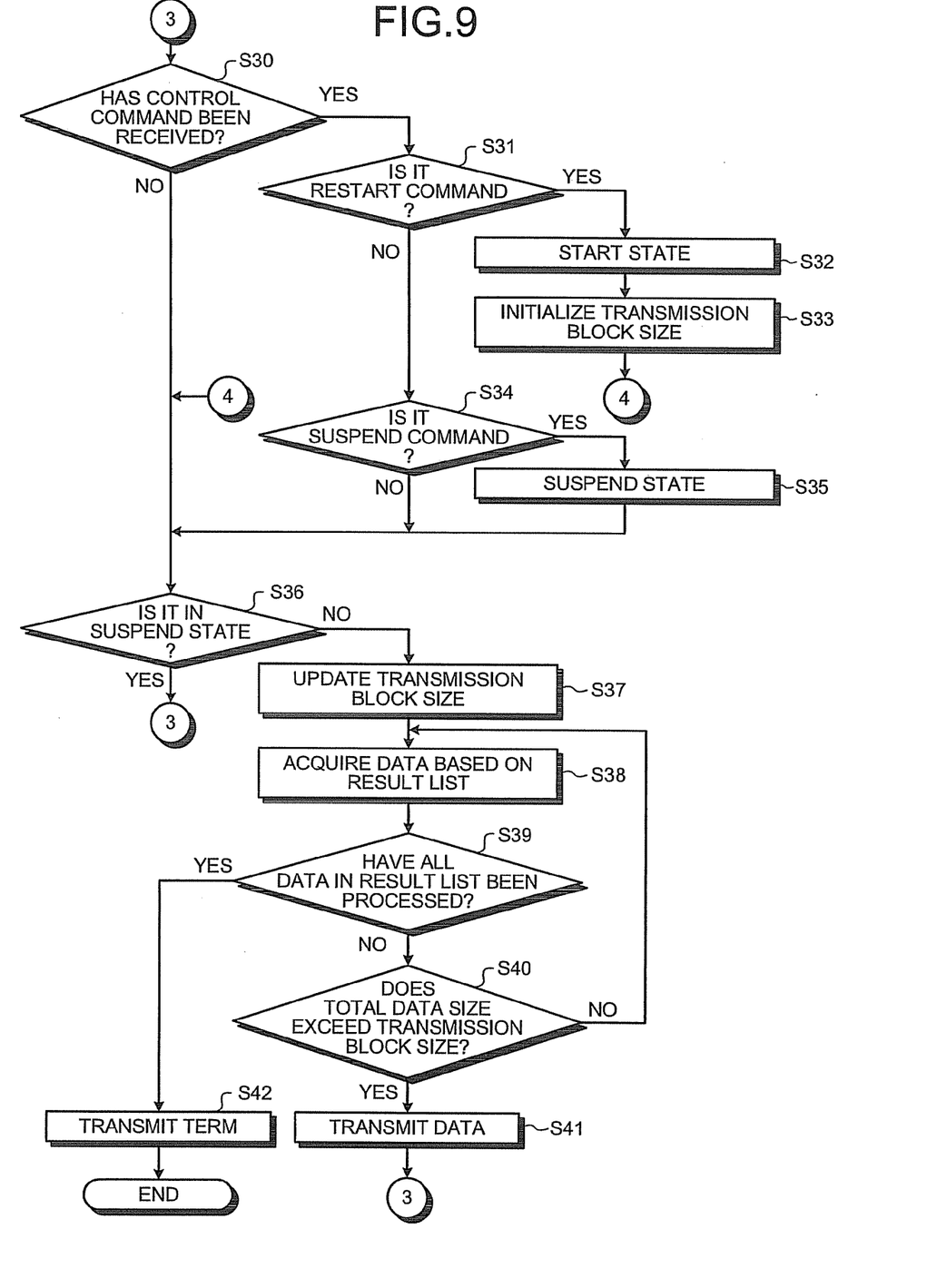
FIG. 9 is a flowchart of a process procedure performed by a fetch controller of the DB server.

A process procedure performed by the fetch controller 705A in the DB server 70A is explained with reference to FIG. 9. It is assumed here that the query analyzing unit 702A in the DB server 70A analyzes the distributed plan transmitted from the coordinator server 60, and a data set acquired as a result of execution of the single plan generated by the single plan generator 703A by the single-plan executing unit 704A is buffered in the storage unit such as a RAM as a result list. At Step S30, the fetch controller 705A determines whether a control command has been received from the coordinator server 60. When the determination result is positive, the fetch controller 705A determines whether the received control command is RESTART command (Step S31). When the determination result is positive, and if the DB server 70A is in the suspended (SUSPEND) state, the DB server 70A is changed to the START state (Step S32), to return the transmission block size to an initial value (Step S33), to proceed to Step S36. The initial value of the transmission block size is prestored in the storage unit or the external storage unit.

When the determination result at Step S31 is negative, the fetch controller 705A determines whether the received control command is SUSPEND command (Step S34). When the determination result is positive, the DB server 70A is changed to the SUSPEND state (Step S35), to proceed to Step S36. Further, when the determination result at Step S34 is negative, control proceed to Step S36.

At Step S36, the fetch controller 705A determines whether the own controller is in the SUSPEND state, and when the determination result is negative, increases the transmission block size (Step S37). For example, the fetch controller 705A calculates the transmission block size using $$y = C \times x \times 2 \quad (1)$$

where y is transmission block size, x is the number of transmission, and C (block size or the like) is a constant.

By calculating the transmission block size according to such Equation (1), the transmission block size can be monotonously increased according to the number of transmission. In this case, the initial value of the transmission block size returned at Step S33 becomes "2C".

Thereafter, the fetch controller 705A takes out data sets from the result list for the transmission block size (Step S38), determines whether all the data sets in the result list have been processed (Step S39), and when the determination result is negative, determines whether the total data size of the data sets to be transmitted exceeds the transmission block size (Step S40). When the determination result is positive, the fetch controller 705A transmits the data sets to the coordinator server 60 (Step S41). When all the data sets in the result list have been transmitted (YES at Step S39), the fetch controller 705A transmits termination status (TERM) to the coordinator server 60 (Step S42).

The fetch controller 705A transmits the data set as the processing result in response to the control command from the coordinator server 60. Because the process procedure performed by the fetch controller 705B in the DB server 70B is the same as the above procedure, explanations thereof are omitted.

Figure 10:
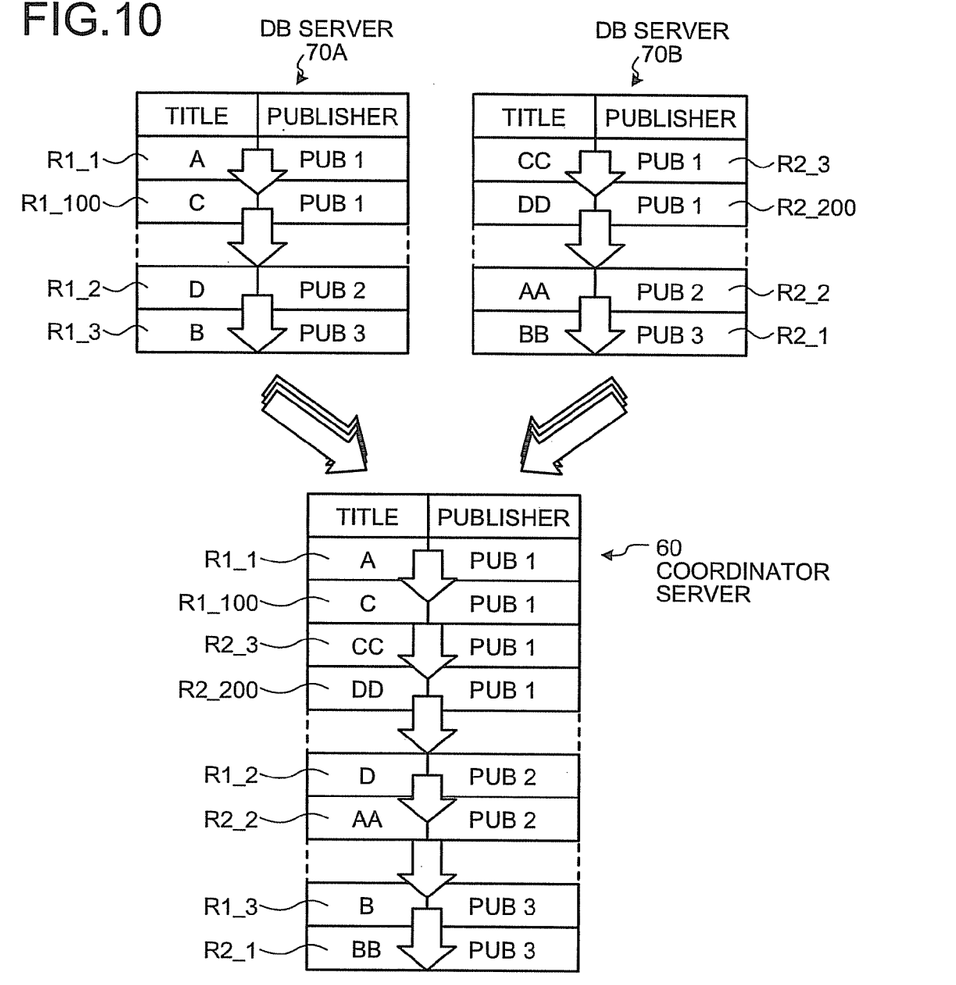
FIG. 10 is a schematic diagram of a data set transmitted respectively from the DB servers and a data set in which these data sets are merged by the coordinator server.

FIG. 10 is a schematic diagram of a data set transmitted respectively from the DB servers 70A and 70B and a data set in which these data sets are merged by the coordinator server 60. As shown in FIG. 10, the data sets respectively transmitted from the DB servers 70A and 70B are merged by the coordinator server 60 and transmitted to the client 50.

Figure 11:
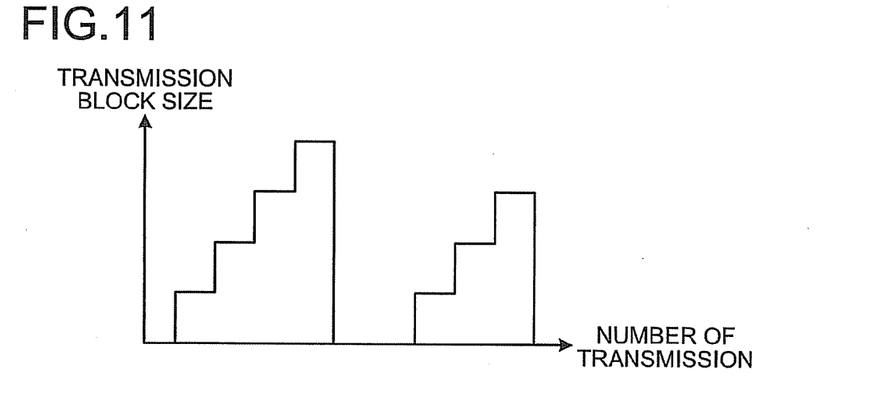
FIG. 11 is a schematic diagram for explaining a characteristic related to a monotonous increase of transmission block size of the data set to be transmitted by the DB server.

A change in the transmission block size of the data set transmitted by the DB server 70A is explained here. FIG. 11 is a schematic diagram for explaining a characteristic involved with a monotonous increase of the transmission block size of the data set transmitted by the DB server 70A. In FIG. 11, it is shown that the transmission block size is small in the first transmission, and increases stepwise until the transmission block size becomes constant in and after the second transmission. Further, it is shown that when the DB server 70A once becomes the SUSPEND state, the transmission block size becomes "0", and when the DB server 70A becomes the START state, the transmission block size increases stepwise from the same size as in the first transmission.

Figure 12:
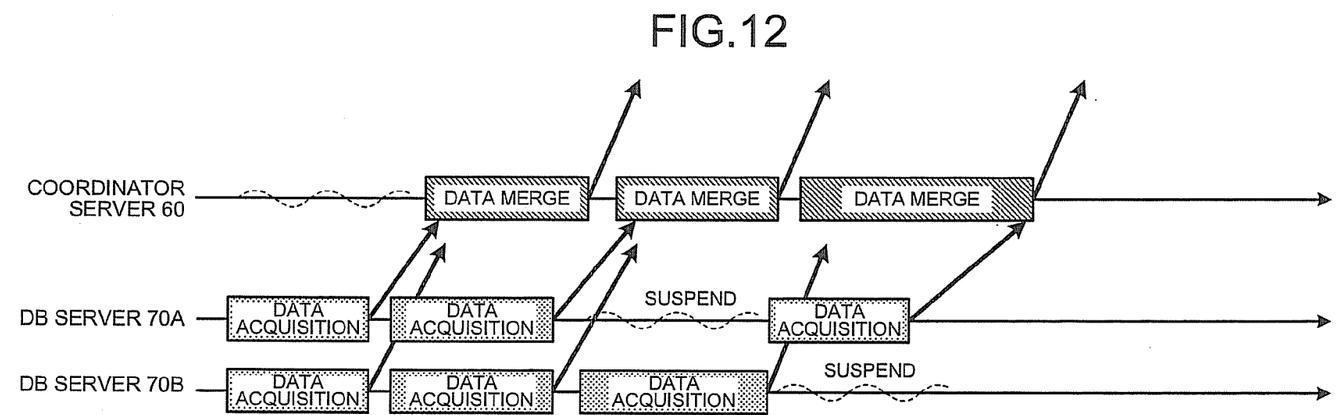
FIG. 12 depicts processing performed by the coordinator server and processing performed by the DB servers chronologically simplified as a flow of pipeline processing.

FIG. 12 depicts the processing performed by the coordinator server 60 and the processing performed by the DB servers 70A and 70B chronologically simplified as a flow of the pipeline processing. In FIG. 12, it is shown that the transmission block size of the data set respectively transmitted from the DB servers 70A and 70B increases stepwise, and when the DB server 70A returns to the START state from the SUSPEND state, the transmission block size is initialized. Further, it is also shown that in the coordinator server 60, a data merge process for merging the data sets transmitted from the DB servers 70A and 70B is performed without stagnation.

Figure 13:
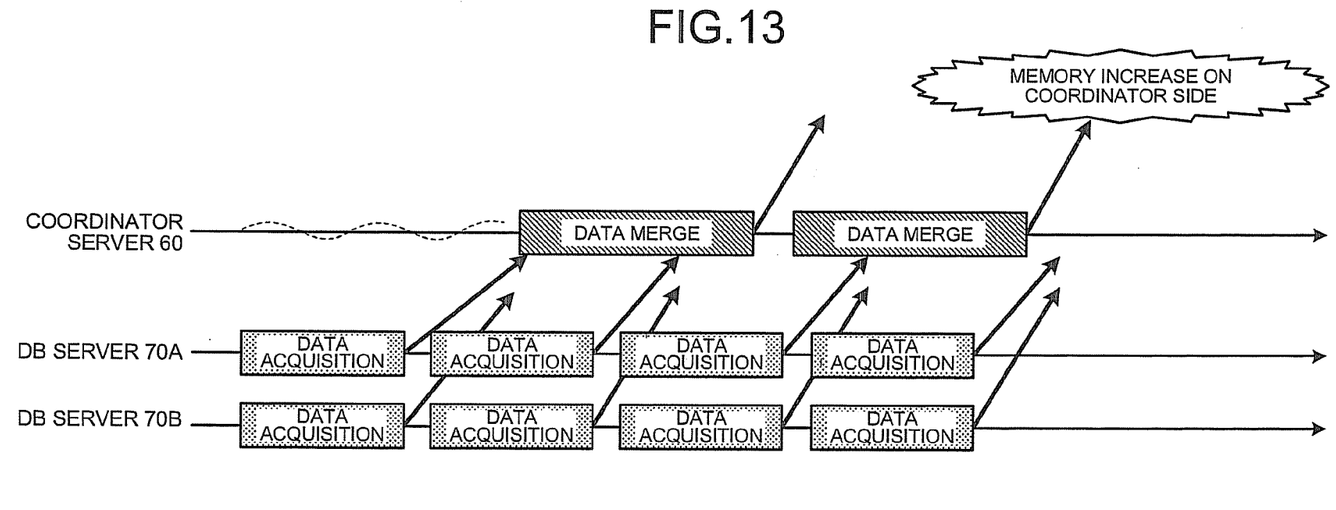
FIG. 13 depicts a chronologically simplified flow of the pipeline processing when the processing performed by the coordinator server cannot catch up with the processing performed by the DB servers in conventional pipeline processing.

On the other hand, FIG. 13 depicts a chronologically simplified flow of the pipeline processing when the processing performed by the coordinator server 60 cannot catch up with the processing performed by the DB servers 70A and 70B in the conventional pipeline processing. In such a case, the data sets transmitted from the DB servers 70A and 70B are accumulated too much in the coordinator server 60, which can put pressure on the resources such as the memory of the coordinator server 60. In the present embodiment, pressure on the resources can be avoided by appropriately determining the data size of the data set accumulated in the coordinator server 60 to appropriately transmit a control command (SUSPEND command) instructing to suspend transmission of the data set to the DB servers 70A and 70B.

Figure 14:
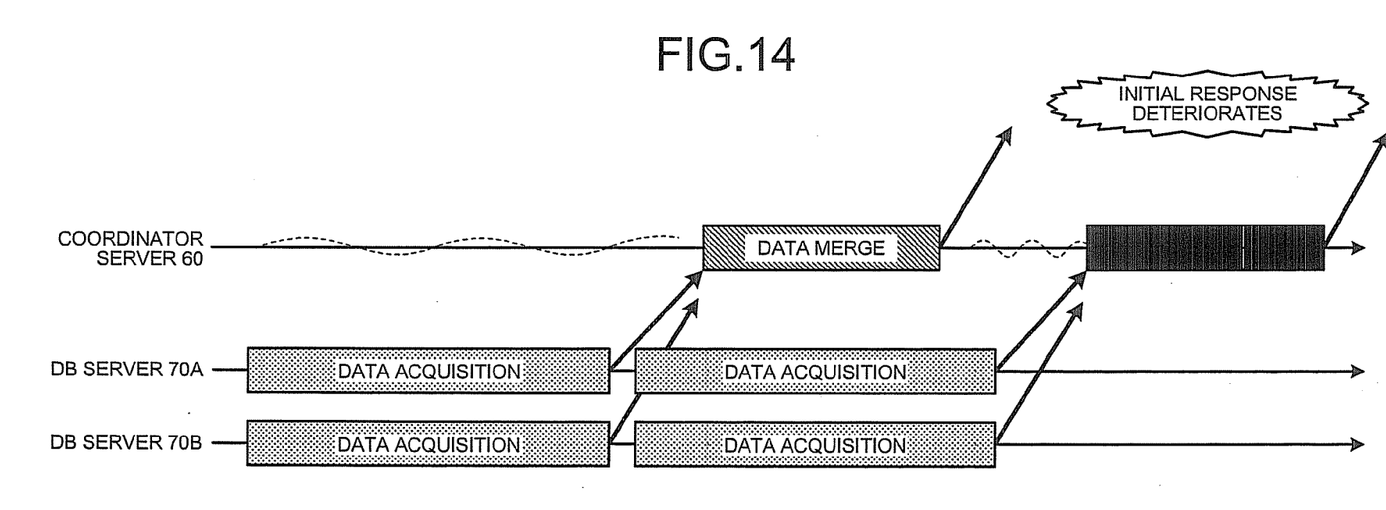
FIG. 14 depicts a chronologically simplified flow of the pipeline processing when the processing performed by the DB servers cannot catch up with the processing performed by the coordinator server.

FIG. 14 depicts a chronologically simplified flow of the pipeline processing, on the contrary, when the processing performed by the DB servers 70A and 70B cannot catch up with the processing performed by the coordinator server 60. In such a case, waiting time of the coordinator server 60 increases, the data acquisition request from the client 50 cannot be immediately responded, and therefore initial responsiveness can be deteriorated. In the present embodiment, deterioration of the initial responsiveness can be suppressed by increasing the transmission block size of the data set transmitted from the DB servers 70A and 70B stepwise from a small value.

Figure 15:
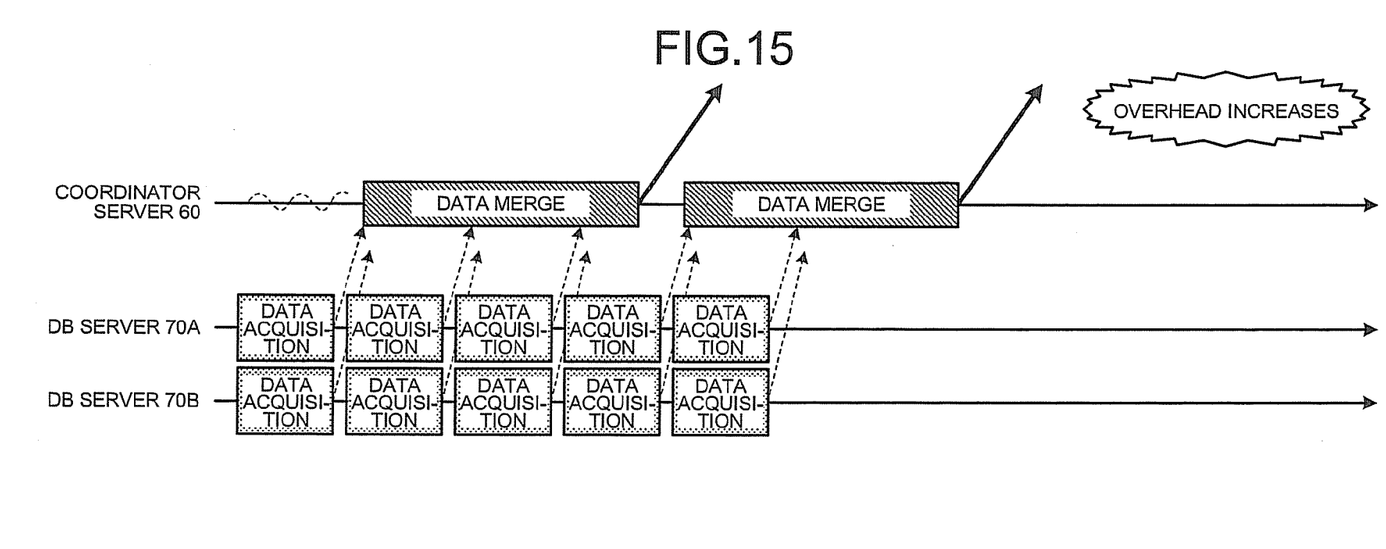
FIG. 15 depicts a chronologically simplified flow of the pipeline processing when transmission-block data size of the data set transmitted from the DB servers is fixed to a small value (for example, one block).

FIG. 15 depicts a chronologically simplified flow of the pipeline processing when transmission-block data size of the data set transmitted from the DB servers 70A and 70B is fixed to a small value (for example, one block). In such a case, overhead can increase in processing other than the essential processing for generating the data set as the processing result in response to the query request, between the coordinator server 60 and the DB servers 70A and 70B. The overhead includes cost required for initialization and termination processing at the time of transmission of the data, and cost required for check in conditional branching. In such a case, the throughput of the entire parallel database system can decrease.

According to the above configuration, the pipeline processing can be smoothly realized in the parallel database without putting pressure on the resources such as the memory of the coordinator server.

When the processing performed by the DB servers 70A and 70B cannot catch up with the processing performed by the coordinator server 60, deterioration of the initial responsiveness, for example, the waiting time of the coordinator server 60 can increase, or the data acquisition request from the client cannot be immediately responded can be suppressed.

Further, an increase of the overhead can be suppressed by increasing stepwise the data size to be transmitted from the DB servers 70A and 70B to the coordinator server 60. Accordingly, improvement of the initial responsiveness and reduction of the overhead can be balanced well.

Furthermore, unnecessary data processing can be reduced because processing is performed with respect to the necessary input line in response to the command from the client 50 and not all the input data is processed. Particularly in data search, even if a large amount of data corresponding to a search condition is hit, only the first several items can be referred to in many cases. Even in this case, the respective phase processing is continued until all the input data is processed in the pipeline processing. However, if the respective phase processing is controlled gently, all the input data is processed, thereby causing execution of unnecessary data processing.

In the above embodiment, various programs to be executed by the coordinator server 60 can be stored on a computer connected to the network such as the Internet, and downloaded via the network. Further, various programs can be recorded on a computer readable recording medium such as a CD-ROM, a flexible disk (FD), a CD-recordable (CD-R), and a digital versatile disk (DVD), and provided in an installable or executable format file. The same applies to various programs to be respectively executed by the DB server 70A to 70B.

In the above embodiment, the coordinator server 60 has the data merge unit 608; however, the coordinator server 60 can have a unit that integrates data according to various methods (by union or join) other than or instead of the data merge unit 608.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coordinator server that is configured to be connected to a plurality of parallelized database servers each storing data and that performs a pipeline processing, comprising:
   a first transmitting unit that transmits a processing command to the database servers in response to a query request for requesting a data acquisition from a client;
   a buffer unit that buffers data sets transmitted from the database servers as a result of a processing according to the processing command;
   an integrating unit that integrates the data sets buffered in the buffer unit to obtain a merged data set;
   a second transmitting unit that transmits the merged data set to the client;
   a first determining unit that determines a transmission start or a transmission suspend of the data sets from the database servers based on a data size of the data sets buffered in the buffer unit; and a third transmitting unit that transmits a control command instructing the transmission start or the transmission suspend of the data sets to the database servers based on a result of determination by the first determining unit.

2. The coordinator server according to claim 1, wherein the buffer unit includes a plurality of first buffer units for buffering the data sets transmitted from the database servers, and a second buffer unit for buffering a data set obtained by integrating the data sets buffered in the first buffer units, the integrating unit integrates the data sets buffered in the first buffer units and buffers the data set obtained by integrating the data sets in the second buffer unit, and the first determining unit determines the transmission start or the transmission suspend of the data sets based on at least one of a data size of the data sets buffered in the first buffer units and a data size of the data set buffered in the second buffer unit.

3. The coordinator server according to claim 2, wherein the first determining unit determines the transmission start of the data sets when the data size of the data sets buffered in the first buffer units is equal to or smaller than a first threshold and the data size of the data set buffered in the second buffer unit is equal to or smaller than a second threshold.

4. The coordinator server according to claim 2, wherein the first determining unit determines the transmission suspend of the data sets when the data size of the data sets buffered in the first buffer units is equal to or larger than a first threshold and the data size of the data set buffered in the second buffer unit is equal to or larger than a second threshold.

5. The coordinator server according to claim 2, wherein the buffer unit further includes a third buffer unit for buffering a processing request relating to transmission of the result of the processing transmitted from the client, the coordinator server further comprises a second determining unit that determines whether to transmit the data set buffered in the second buffer unit to the client in response to the processing request buffered in the third buffer unit, and the second transmitting unit transmits the data set buffered in the second buffer unit to the client according to a result of determination by the second determining unit.

6. The coordinator server according to claim 1, wherein the integrating unit merges the data sets transmitted from the database servers.

7. A pipeline processing control method to be executed in a coordinator server that is connected to a plurality of parallelized database servers each storing data and that performs a pipeline processing, the pipeline processing control method comprising:
- transmitting a processing command to the database servers in response to a query request for requesting a data acquisition from a client;
- transmitting including integrating data sets transmitted from the database servers as a result of a processing according to the processing command, and transmitting a data set obtained by integrating the data sets to the client;
- integrating the data sets transmitted from the database servers and buffered in a buffer unit;
- determining a transmission start or a transmission suspend of the data sets from the database servers based on a data size of the data sets buffered in the buffer unit; and
- transmitting a control command instructing the transmission start or the transmission suspend of the data sets to the database servers based on a result of determination at the determining.

* * * * *